(12) United States Patent
Dottax et al.

(10) Patent No.: US 12,158,944 B2
(45) Date of Patent: Dec. 3, 2024

(54) AUTHENTICATION OF A DEVICE BY A CRYPTOGRAPHIC PROCESS

(71) Applicant: IDEMIA FRANCE, Courbevoie (FR)

(72) Inventors: Emmanuelle Dottax, Talence (FR); Luk Bettale, Chatou (FR); Nathan Reboud, Paris (FR)

(73) Assignee: IDEMIA FRANCE, Courbevoie (FR)

( * ) Notice: Subject to any disclaimer, the term of this patent is extended or adjusted under 35 U.S.C. 154(b) by 255 days.

(21) Appl. No.: 17/708,093

(22) Filed: Mar. 30, 2022

(65) Prior Publication Data
US 2022/0318368 A1   Oct. 6, 2022

(30) Foreign Application Priority Data
Apr. 2, 2021   (FR) ..................................... 21 03451

(51) Int. Cl.
*G06F 21/44* (2013.01)
*G06F 21/60* (2013.01)
*H04L 9/08* (2006.01)

(52) U.S. Cl.
CPC .......... *G06F 21/445* (2013.01); *G06F 21/602* (2013.01); *H04L 9/0822* (2013.01); *G06F 2221/2103* (2013.01)

(58) Field of Classification Search
CPC ................. G06F 21/445; G06F 21/602; G06F 2221/2103; G06F 21/605; H04L 63/0442;
(Continued)

(56) References Cited

U.S. PATENT DOCUMENTS 10,511,436 B1 * 12/2019 Machani ................. H04L 9/085
2015/0256518 A1 *  9/2015 Buer ...................... H04L 9/0822
                                                        713/171
(Continued)

FOREIGN PATENT DOCUMENTS

CN        110855616 A *  2/2020    ......... G07C 9/00309

OTHER PUBLICATIONS

White-Box Cryptography and an AES Implementation (Stanley Chow, Philip A. Eisen, Harold Johnson, and Paul C. van Oorschot ; In Kaisa Nyberg and Howard M.Heys, editors ; Selected Areas in Cryptography, vol. 2595 of Lecture Notes in Computer Science, pp. 250-270. Springer, 2002; https://link.springer.com/content/pdf/10.1007/3-540-36492-7_17.pdf.

(Continued)

*Primary Examiner* — Jung W Kim
*Assistant Examiner* — James P Moles
(74) *Attorney, Agent, or Firm* — WOMBLE BOND DICKINSON (US) LLP

(57) ABSTRACT

A processing method implemented by a first device including receiving first data including a challenge datum; obtaining key data including an encrypted cryptographic key which is masked by executing a cryptographic masking function; receiving an unmasking key; determining the encrypted cryptographic key by executing a cryptographic unmasking function on the basis of the unmasking key; determining a decrypted cryptographic key by a decryption by executing a decryption algorithm with white-box implementation on the basis of the encrypted cryptographic key; determining an answer datum by a cryptographic operation by executing a predetermined cryptographic algorithm on the basis of the decrypted cryptographic key and the challenge datum; and sending the answer datum to authenticate the first device.

20 Claims, 7 Drawing Sheets

(58) Field of Classification Search
CPC ..... H04L 63/068; H04L 9/0822; H04L 9/088; H04L 9/3213; H04L 9/3273; H04L 9/3271; H04L 2209/04; H04L 2209/16; H04L 2209/80; H04L 2209/84
See application file for complete search history.

(56) References Cited

U.S. PATENT DOCUMENTS

| | | | |
|---|---|---|---|
| 2019/0268169 A1* | 8/2019 | Castillo | H04L 9/0869 |
| 2020/0029213 A1* | 1/2020 | Nölscher | B60R 25/24 |
| 2021/0344485 A1* | 11/2021 | Levin | H04L 9/0825 |
| 2023/0025166 A1* | 1/2023 | Rasoamiaramanana | H04L 63/0435 |

OTHER PUBLICATIONS

English language abstract of CN110855616.

\* cited by examiner

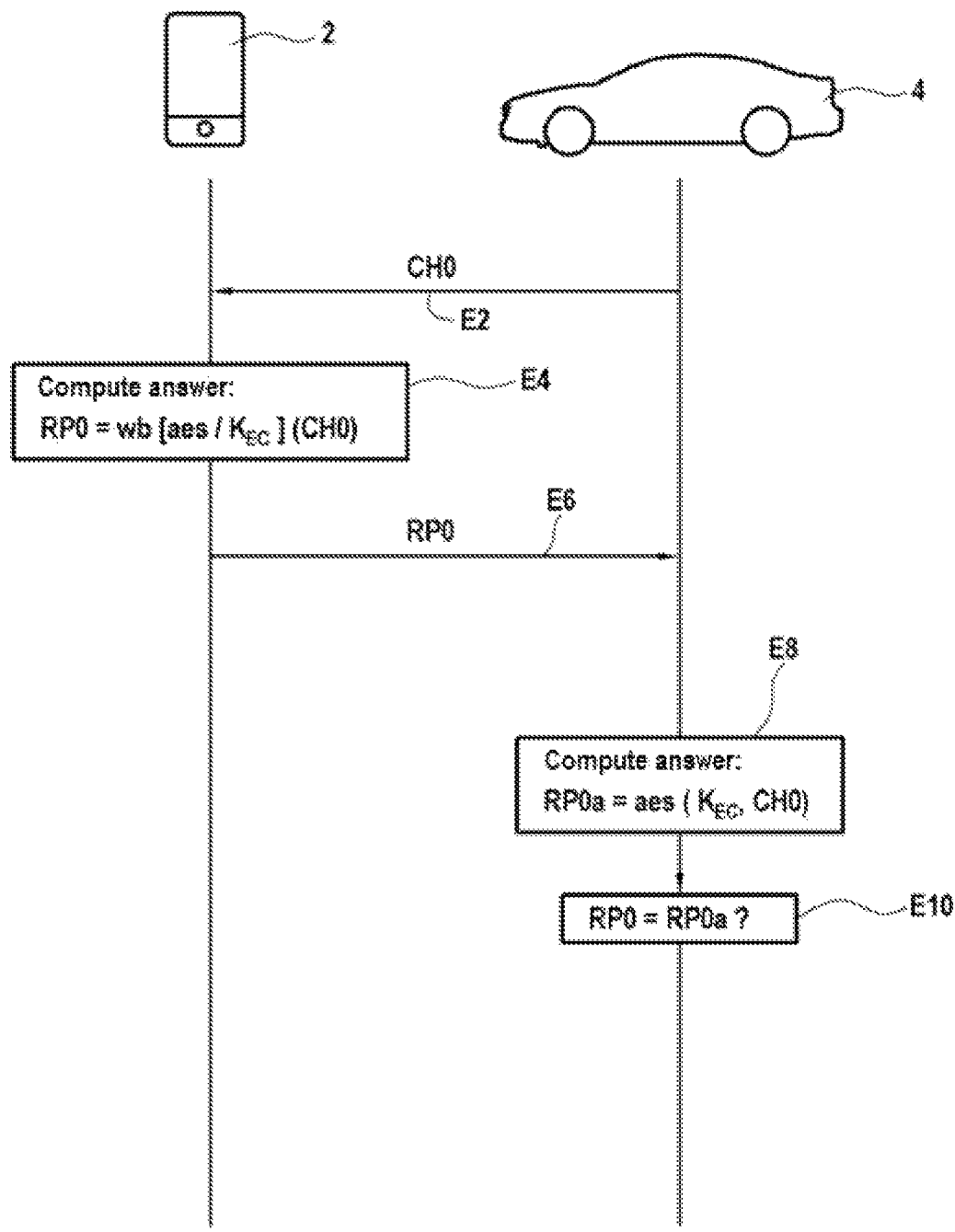

[Fig. 2]
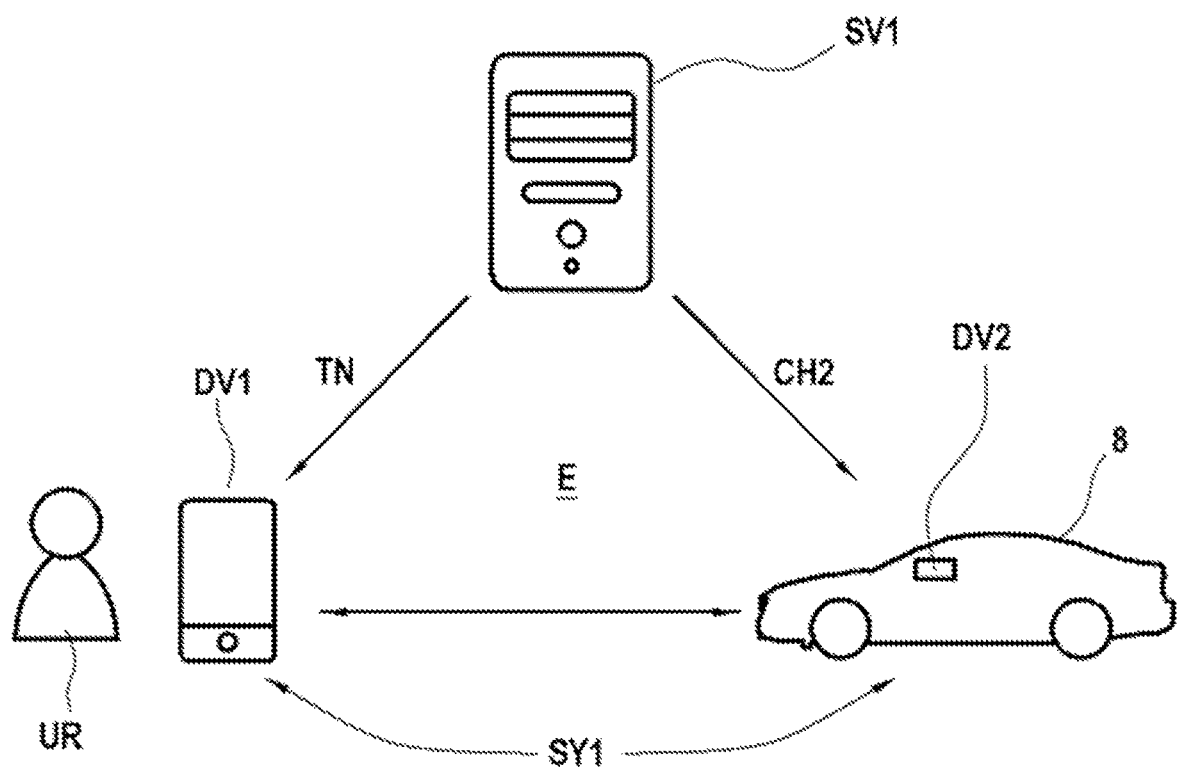

[Fig. 3]
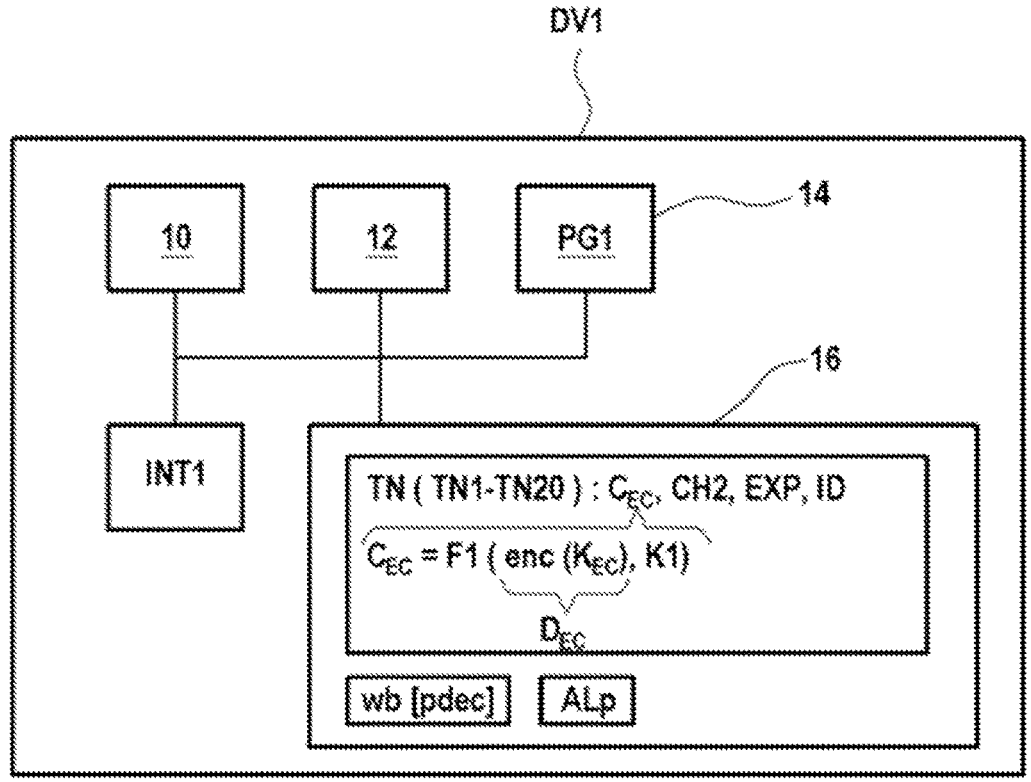
[Fig.4]
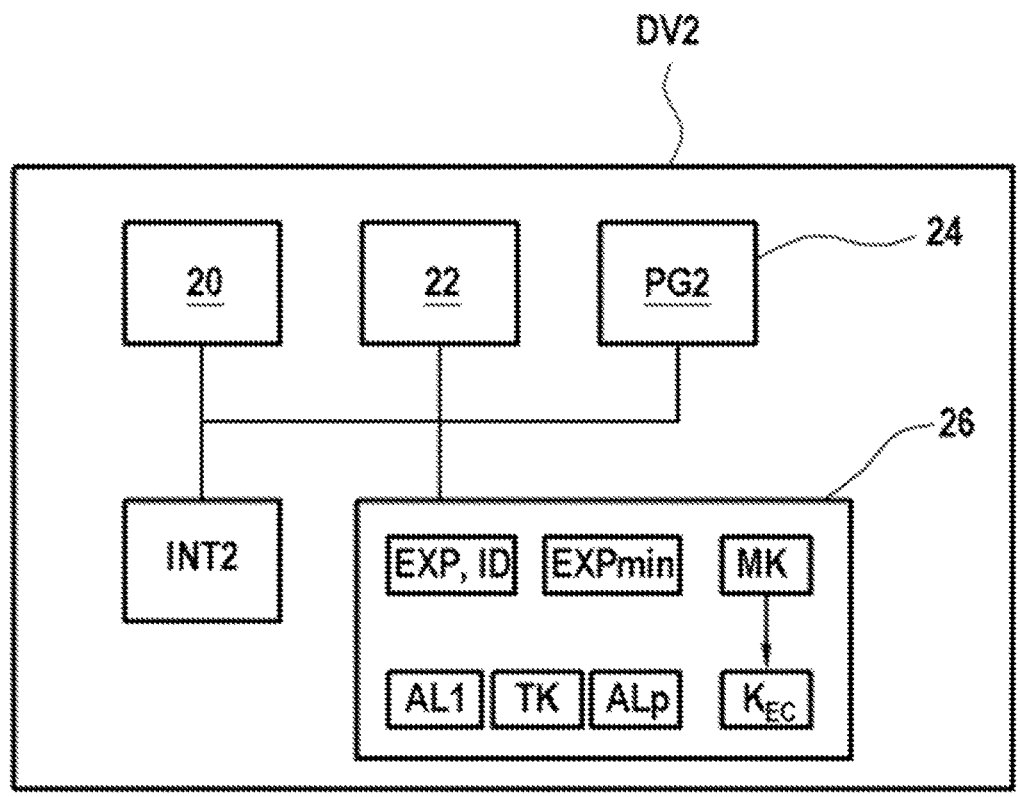

[Fig. 5]
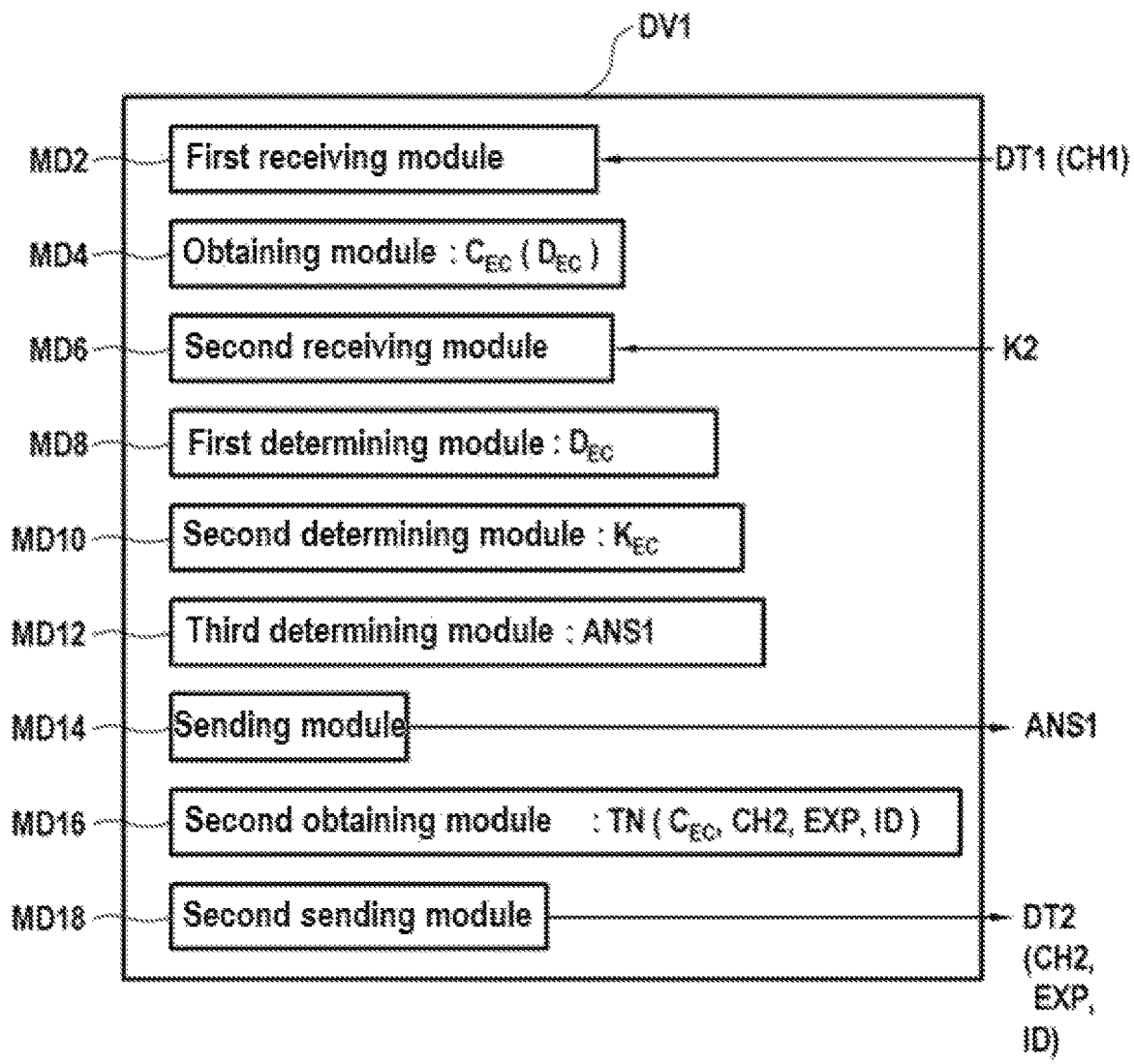

[Fig. 6]
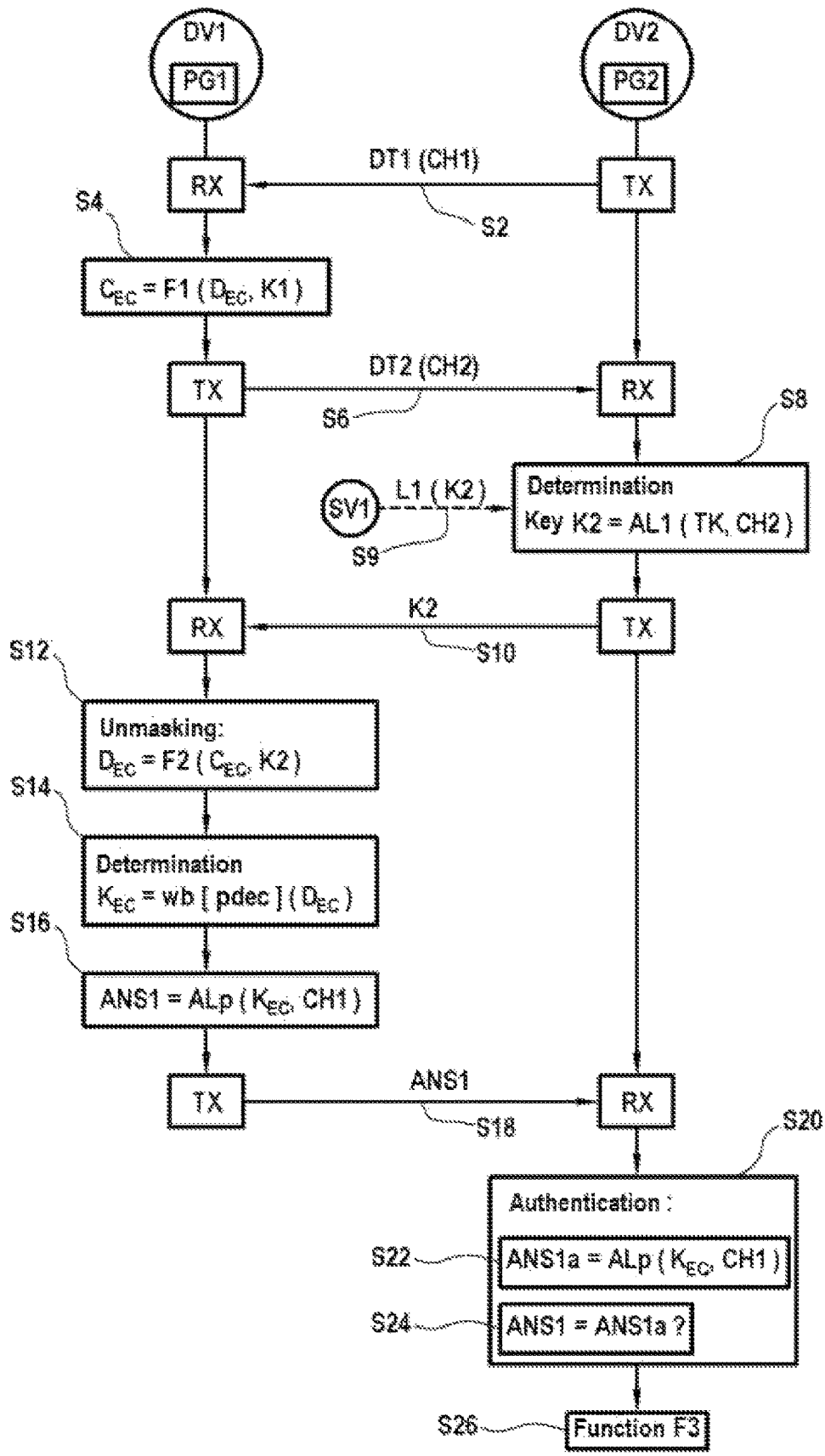

[Fig. 7]
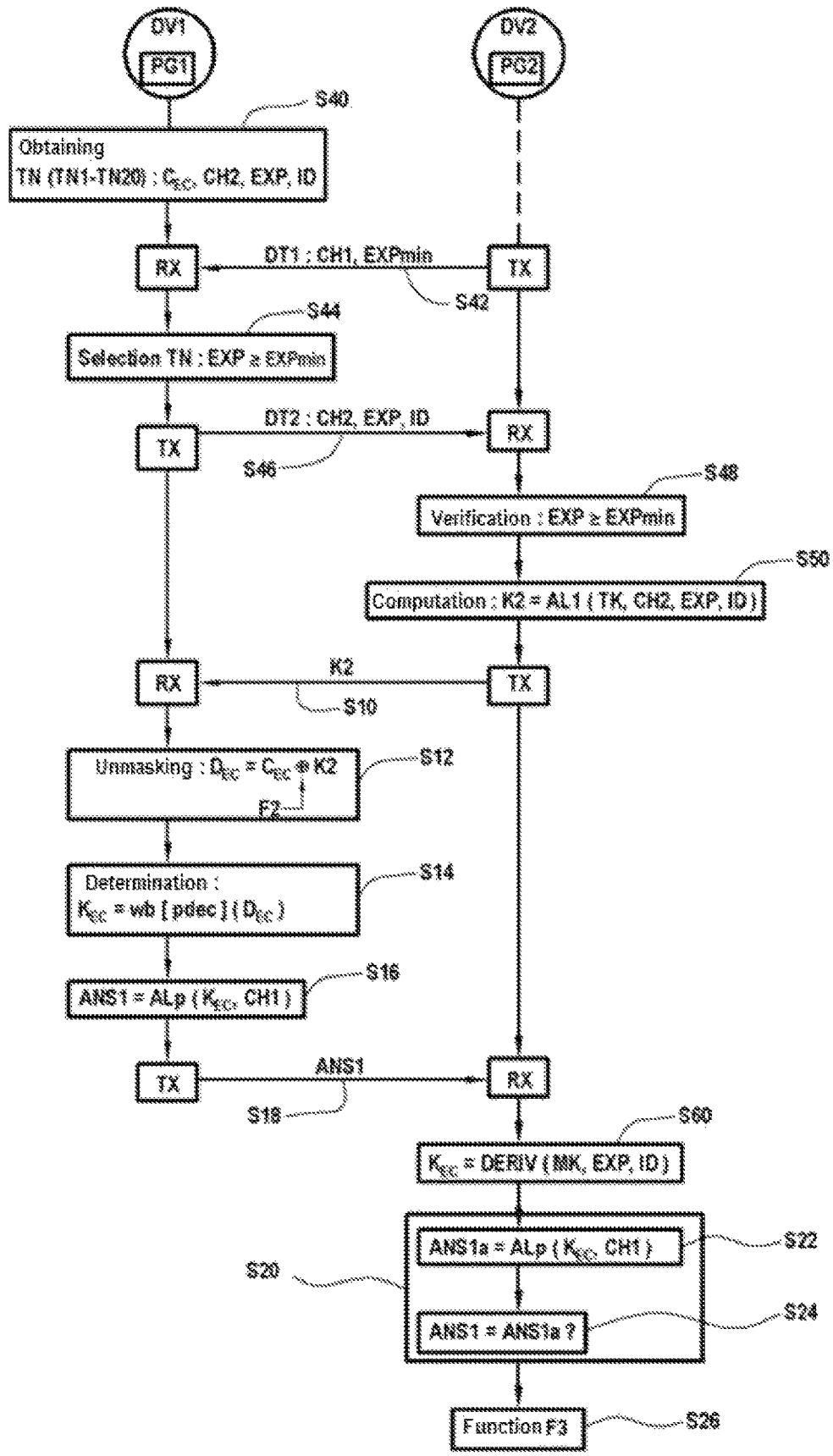

[Fig. 8]
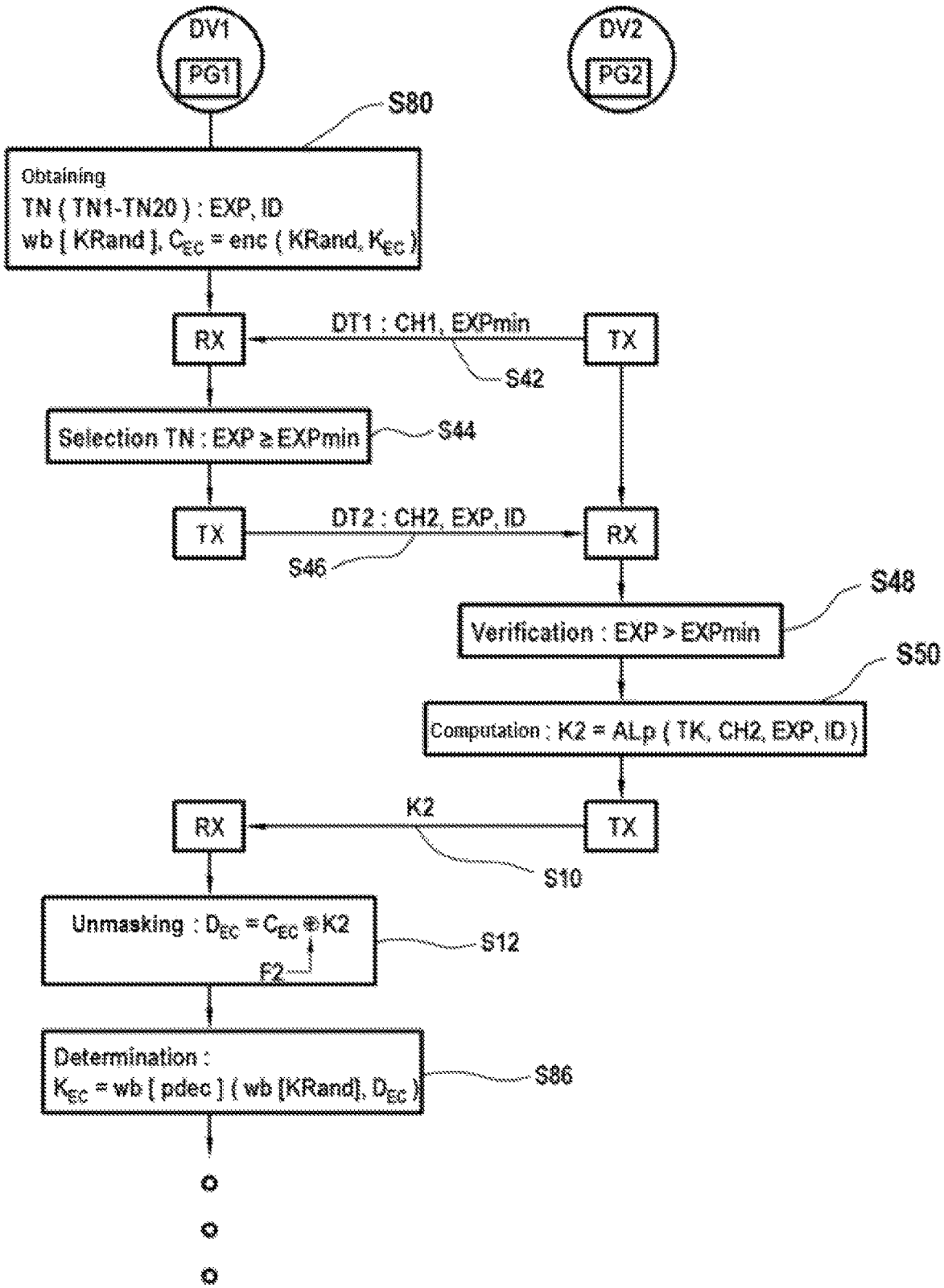

AUTHENTICATION OF A DEVICE BY A CRYPTOGRAPHIC PROCESS

TECHNICAL FIELD

The disclosure relates to the field of cryptography and specifically relates to the implementation of cryptographic processing to authenticate a first device to a second device.

BACKGROUND

Digital devices (also known as computer devices or digital appliances), such as computers, tablets, chip cards, mobile phones, connected objects etc. are omnipresent in everyday life. These devices often require the implementation of security solutions to protect access to the device and secure sensitive data against any attacks.

A common security solution includes embedding a secure element into such devices. As defined by the "Global Platform" standards organization well-known to those skilled in the art, a secure element is a hardware and software platform configured to securely host applications and their associated sensitive data (cryptographic keys, algorithms etc.), in compliance with rules set by a trusted third-party authority. A secure element provides applications with a secure execution environment. It may take various hardware forms, such as a UICC (Universal Integrated Circuit Card) module, an embedded secure element (or "embedded SE" or again "eSIM") or else a microSD card. UICC module and microSD card are generally removable. Each form of secure element is intended to be used in very specific applications and must meet the particular requirements of the market in question.

Secure elements offer a good level of protection but their deployment is complex and restrictive insofar as it requires very specific equipment and services supplied by specialists. The use of secure elements to secure devices makes implementation and operation more complicated and is thus not always desirable.

Another solution includes implementing applications in open appliances such as PCs, tablets or smartphones, without using any secure elements. This makes it possible to access new markets and simplify the deployment of applications. To secure open devices, purely software solutions, for example of cryptographic type, must be implemented.

A security challenge does however arise in that the source code and data implemented in open devices (without using secure elements) are liable to be accessible by potential hackers. Open devices may be exposed to "white box" attacks in the sense that the attacker has full access to the software implementation of a cryptographic algorithm: the binary is then fully visible and modifiable by the attacker and they have full control of the execution platform. Consequently, it is necessary to sufficiently secure the software implementation of applications in open devices.

Various known software solutions can be used to secure an open device, among them "white box" cryptography. Cryptographic solutions with white-box implementation are based on the implementation of a cryptographic algorithm while protecting the secret cryptographic keys that are used. White box cryptography can be applied to any cryptographic algorithm used in an application that one wishes to protect. The white-box implementation of a cryptographic algorithm includes modifying (complicating, masking etc.) the implementation of the algorithm in question, for example by changing the internal representations of the functions and data involved, such as to protect the secret keys used.

White-box implementation can also include, for example, in incorporating a secret (in the form of data, but also in the form of code) and random data instanced at the time of compilation into a composition in which it is then difficult to deduce said secret. By way of example, a white-box implementation of an AES (Advanced Encryption Standard) encryption algorithm can be used in an application to authenticate a user.

However, a security problem arises in that, even with white-box implementation, cryptographic algorithms can be vulnerable to certain attacks (statistical attacks), on condition that the attackers roll out the necessary resources. Such attacks are possible, particularly when the attackers are capable of monitoring the execution of the application on the basis of the memory.

Should an attacker manage to discover the cryptographic keys of a cryptographic algorithm with white-box implementation, it is necessary for the supplier of the application in question to use a new white-box implementation, of different design, to once more secure the cryptographic algorithm in question and a new associated secret. This poses a problem insofar as the number of white-box implementations possible for a given algorithm is relatively limited. The supplier thus has a very limited freedom when it comes to choosing or modifying a white-box implementation of a cryptographic algorithm. It can therefore quickly become difficult to secure a cryptographic algorithm exposed to attacks.

Also, it is desirable to sufficiently secure a cryptographic algorithm such that the cryptographic key or keys used are efficiently protected from any attacks. In addition, when an attacker manages a successful attack against a cryptographic algorithm used to protect a given application, it is necessary to be able to easily adapt the software implementation in order to be able to secure the application in question as well as possible.

Furthermore, when a cryptographic algorithm is used to protect a protocol or a given application, it is desirable to be able to adapt the software implementation of the cryptographic algorithm as required without this affecting the given protocol or application (thus with a minimum of impact for the protocol or application in question).

SUMMARY

For this purpose, this disclosure relates to a processing method implemented by a first device cooperating with a second device, said method including:
  a) receiving, from the second device, first data including a first challenge datum;
  b) obtaining key data including an encrypted cryptographic key resulting from an encryption by a first encryption algorithm, said key data being masked by executing a cryptographic masking function on the basis of the encrypted cryptographic key and a masking key;
  c) receiving, from the second device, an unmasking key;
  d) determining the encrypted cryptographic key by executing a cryptographic unmasking function on the basis of the key data obtained in b) and the unmasking key received in c);
  e) determining a decrypted cryptographic key by a decryption by executing a first decryption algorithm with white-box implementation on the basis of the encrypted cryptographic key;
  f) determining an answer datum by a cryptographic operation by executing a predetermined cryptographic algorithm on the basis of the decrypted cryptographic key and the first challenge datum received; and g) sending to the second device, in response to the first data received in a), the answer datum to authenticate the first device to the second device.

This disclosure advantageously makes it possible to authenticate, securely and flexibly, a first device to a second device. The disclosure in particular makes it possible to secure any cryptographic algorithm effectively and with more freedom in the software implementation used.

The disclosure makes it possible to secure a cryptographic algorithm such that the cryptographic key or keys used are protected effectively from any attacks. In addition, when an attacker makes a successful attack on a cryptographic algorithm used to protect a given application, it is possible, using the disclosure, to easily adapt the software implementation to be able to secure the application in question as well as possible.

Furthermore, when a cryptographic algorithm is used to protect a given protocol or application, the disclosure makes it possible to adapt the software implementation of the cryptographic algorithm as required without this affecting the given protocol or application (therefore with a minimum of impact for the protocol or application in question).

According to a particular embodiment, the first encryption algorithm and the first decryption algorithm are associated cryptographic algorithms configured to perform inverse cryptographic functions.

According to a particular embodiment, the first encryption and decryption algorithms are different from the predetermined cryptographic algorithm.

According to a particular embodiment, the method further includes, before receiving c) the unmasking key:

h) sending, to the second device, second data including a second challenge datum; wherein the unmasking key received in c) from the second device is computed on the basis of the second challenge datum.

According to a particular embodiment, the method includes, before h):

i) obtaining a token, including:
   the key data;
   a first time datum indicating a validity period during which the cryptographic key is valid; and
   an identifier of said cryptographic key usable during said validity period; wherein the second data sent in h) include the first time datum and the identifier extracted from the token.

According to a particular embodiment, the method further includes:

j) selecting, on the basis of a second time datum contained in the first data received in a), the token obtained in i) from among one or more tokens accessible by the first device,
   said second time datum being indicative of a validity period in which the cryptographic key of the selected token must be valid.

According to a particular embodiment, the token obtained in i) further includes the second challenge datum which is separate from the first time datum and from the identifier; wherein the second data sent in h) include the second challenge datum extracted from the token.

According to a particular embodiment, the first time datum and the identifier contained in the two data sent in h) constitute the second challenge datum.

According to a particular embodiment, the token further includes a key encoded in a format suitable for white-box implementation, wherein, in e), the decrypted cryptographic key is determined by a decryption by executing the first decryption algorithm with white-box implementation on the basis of the encrypted cryptographic key and of the key encoded in a format suitable for white-box implementation extracted from the token.

According to a particular embodiment, the cryptographic masking and unmasking functions are associated encryption and decryption functions respectively.

According to a particular embodiment, the cryptographic masking and unmasking functions are symmetrical encryption functions, the masking key and the unmasking key being identical.

According to a particular embodiment, the cryptographic masking and unmasking functions are XOR functions.

According to a particular embodiment, the method includes, following g):

k) in response to a detection that the first device is authenticated successfully to the second device, triggering a predetermined function in cooperation with the second device.

In a particular embodiment, the different steps of the processing method are determined by computer program instructions.

Consequently, the disclosure also relates to a computer program on an information medium (or recording medium), this program being able to be implemented in a device (the so-called "first device") or more generally in a computer, this program including instructions suitable for implementing the steps of a processing method as defined in this document.

This program can use any programming language, and be in the form of source code, object code, or intermediate code between source code and object code, such as in a partially compiled form, or in any other desirable form.

The disclosure also relates to an information medium (or recording medium) readable by a computer, and including instructions of a computer program as defined in this document.

The information medium can be any entity or device capable of storing the program. For example, the medium can include a storage means, such as a non-volatile rewritable or ROM memory, for example a CD-ROM or a microelectronic circuit ROM, or else a magnetic recording means, for example a floppy disk or a hard disk.

Moreover, the information medium can be a transmissible medium such as an electrical or optical signal, which can be conveyed via an electrical or optical cable, by radio or by other means. The program according to the disclosure can be in particular be downloaded over a network of Internet type.

Alternatively, the information medium can be an integrated circuit wherein the program is incorporated, the circuit being suitable for executing or for being used in the execution of the method in question.

This disclosure also relates to a device, the so-called first device, able to implement the processing method as defined in this document. In particular, the disclosure makes provision for a first device able to cooperate with a second device, including:

a first receiving module configured to receive, from the second device, first data including a first challenge datum;

an obtaining module configured to obtain key data including an encrypted cryptographic key resulting from an encryption by a first encryption algorithm, said key data being masked by execution of a cryptographic masking function on the basis of the encrypted cryptographic key and of a masking key;

a second receiving module configured to receive, from the second device, an unmasking key;

a first determining module configured to determine the encrypted cryptographic key by executing a cryptographic unmasking function on the basis of the key data obtained and the unmasking key received;

a second determining module configured to determine a decrypted cryptographic key by a decryption by executing a first decryption algorithm with white-box implementation on the basis of the encrypted cryptographic key;

a third determining module configured to determine an answer datum by a cryptographic operation by executing a predetermined cryptographic algorithm on the basis of the decrypted cryptographic key and of the first received challenge datum; and a sending module configured to send to the second device, in response to the first received data, the answer datum to authenticate the first device to the second device.

Note that the different embodiments mentioned above (as well as those described hereinafter) in relationship with the processing method of the disclosure as well as the associated advantages are applicable in a similar manner to the first device of the disclosure.

For each step of the processing method, the first device of the disclosure may include a corresponding module configured to perform said step.

In this perspective, the term "module" in this document may just as well be a software component, a hardware component or an assembly of hardware and software components.

A software component is equivalent to one or more computer programs, one or more sub-programs of a program, or more generally any element of a program or software able to implement a function or a set of functions, according to that which is described below for the module in question. Such a software component can be executed by a data processor of a physical entity (terminal, server, gateway, router etc.) and is able to access the hardware resources of this physical entity (memories, recording media, communication bus, electronic input/output cards, user interfaces, etc.).

In the same way, a hardware component is equivalent to any element of a hardware assembly able to implement a function or a set of functions, as described below for the module in question. It may be a programmable hardware component or one with an integrated processor for executing software, for example an integrated circuit, a chip card, a memory card, an electronic card for executing firmware, etc.

BRIEF DESCRIPTION OF THE DRAWINGS

Other features and advantages of this disclosure will become apparent from the description given below, with reference to the appended drawings which illustrate exemplary embodiments thereof devoid of any limitation. In the figures:

FIG. 1 schematically represents a method for authenticating a first device to a second device according to a first example;

FIG. 2 schematically represents an environment wherein a first device cooperates with a second device and a remote server, according to a particular embodiment;

FIG. 3 schematically represents the structure of a first device according to a particular embodiment of the disclosure;

FIG. 4 schematically represents the structure of a second device according to a particular embodiment of the disclosure;

FIG. 5 schematically represents modules implemented by a first device according to a particular embodiment of the disclosure;

FIG. 6 represents, in the form of a diagram, the steps of a processing method according to a particular embodiment of the disclosure;

FIG. 7 represents, in the form of a diagram, the steps of a processing method according to a particular embodiment of the disclosure;

FIG. 8 represents, in the form of a diagram, a variant of the processing method shown in FIG. 6.

DESCRIPTION

As already indicated, this document relates to the authentication of a first device, and more generally of a user of this first device, to a second device, for example with a view to accessing any service or any function.

The embodiments described below fall in the category of access control for a vehicle, such as a car for example. Thus, a first device is used by a user to authenticate himself to another device controlling the access to a vehicle. It will however be understood that this disclosure more generally applies to cryptographic processing allowing any first device to authenticate itself to another, so-called second device. By way of example, the second device of the disclosure is configured to control any functionality of a vehicle, such as the control of the doors or the start/stop control of the vehicle. The second device may similarly control the doors of a house, control security gates, control access to transportation or else access to internet services, games consoles etc.

The nature of the first and second devices may vary according to the application or applications envisioned. The first device may for example be a terminal, such as a mobile phone, tablet, computer etc., or else a USB key or equivalent.

The disclosure makes provision for reinforcing the security of an authentication of a first device to a second device, in particular by means of a cryptographic algorithm with white-box implementation for protecting a cryptographic key used for the authentication. To do this, a first device cooperates with a second device in order to authenticate itself to the latter. During a processing method (authenticating method), the first device performs an unmasking of an encrypted cryptographic key which it possesses, using an unmasking key supplied by the second device during a prior interaction between the first and second devices. The first device then decrypts the encrypted cryptographic key thus obtained, by executing a decryption algorithm with white-box implementation. The first device may then generate, on the basis of this decrypted cryptographic key and a challenge datum supplied beforehand by the second device, an answer by executing a predetermined cryptographic algorithm. The sending of this answer to the second device, in response to the first challenge datum, allows the first device to authenticate itself to the second device, the latter being capable of verifying the validity of the answer and deducing therefrom if the authentication succeeds or fails.

Other aspects and advantages of this disclosure will become apparent from the exemplary embodiments described below with reference to the drawings mentioned above.

As already indicated, white-box cryptography is a well-known technique including in implementing the functionality of a given cryptographic algorithm, but by adapting the implementation of this algorithm such as to use a secure implementation, the so-called white-box implementation. The reader is for example referred to the following reference texts: "*White-Box Cryptography and an AES Implementation*" (Stanley Chow, Philip A. Eisen, Harold Johnson, and Paul C. van Oorschot; In Kaisa Nyberg and Howard M. Heys, editors; Selected Areas in Cryptography, volume 2595 of Lecture Notes in Computer Science, pages 250-270. Springer, 2002.

The official specifications (in standards, norms etc.) of cryptographic algorithms supply a description of the mathematical functions implemented in the computations of these algorithms (for example the AES algorithm is standardized by the National Institute of Standards and Technology (NIST)). The white-box implementation of such cryptographic algorithms aims to modify these descriptions, for example by changing the internal representations of the functions or data implemented in these algorithms to hide secrets in the code of the implementation to protect the secrets from any attacks. For example, tables can be used to incorporate both secret keys (in the form of data and/or in code form) and random data with a function whose secret keys are difficult to deduce. The general principle of a white-box implementation of a given cryptographic algorithm being well-known to those skilled in the art, it will not be described in further detail in this document.

As already indicated, the applicant has observed that while the current techniques of cryptographic algorithms with white-box implementation offer advantages in terms of security, they also entail restrictions and limitations of their ability to effectively protect a protocol or an application. This particularly results from the fact that cryptographic algorithms with white-box implementation are generally used by protocols or applications that one wishes to protect, as explained hereinafter.

FIG. 1 schematically represents a first solution in which a MAC (Message Authentication Code) algorithm based on AES (Advanced Encryption Standard) with white-box implementation is used by a first device 2 (a terminal in this example) to authenticate itself to a second device 4 (a vehicle in this example).

As shown in the figure, it is supposed that the terminal 2 and the vehicle 4 interact together during an authenticating method to allow the terminal 2 to authenticate itself to the vehicle 4. The vehicle 4 sends (E2) the terminal 2 a challenge datum CH0 chosen at random. The terminal 2 then computes (E4) an answer RP0 on the basis of the received challenge datum CH0. To do this, the terminal 2 has in its memory an AES-based MAC algorithm, or more precisely a particular white-box implementation—denoted wb[aes/$K_{EC}$]—of this algorithm. This white-box implementation has an embedded cryptographic key $K_{EC}$ which is masked in the code of the implementation. The terminal 2 thus executes (E4) the AES-based MAC algorithm with white-box implementation on the basis of the challenge datum CH0 supplied by the vehicle 4 (which is expressed as RP0=wb[aes/$K_{EC}$] (CH0)). Once determined, the terminal 2 sends (E6) the answer RP0 to the vehicle 4 which can verify the validity of the answer RP0 received. To do this, the vehicle computes (E8) its own answer RP0a by executing the AES-based MAC algorithm on the basis of the challenge datum CH0 and the key $K_{EC}$ it possesses. The vehicle then compares (E10) the received answer RP0 with its theoretical answer RP0a and successfully authenticates the terminal 2 if there is a match between RP0 and RP0a.

In the example shown in FIG. 1, the white-box implementation technique is directly applied to the AES-based MAC algorithm which is used by the vehicle 4 to authenticate the terminal 2, which poses a problem. As already stated, there is only a limited number of possible white-box implementations for one and the same cryptographic algorithm, namely for the AES-based MAC algorithm in this example. If an attacker manages to determine the cryptographic key $K_{EC}$ or if the security of the implementation of the AES-based MAC algorithm is compromised in any way whatsoever in the terminal 2, it can prove difficult to implement a new white-box implementation of this same AES-based MAC algorithm in the terminal 2, while maintaining a good level of security. The programmer only has limited freedom due to the fact that the configuration of the vehicle 4 in this example imposes the use of the AES-based MAC algorithm in the vehicle 4 and therefore also in the terminal 2, and due to the fact that the white-box implementation technique is applied in this example to this AES-based MAC algorithm within the terminal 2. Furthermore, if it is possible to modify the algorithm used by the vehicle 4 to authenticate the terminal 2, this is generally not desirable insofar as it would require in-depth modification of the configuration of devices already deployed in the field.

This disclosure makes provision for changing principle, by this time applying the white-box implementation technique, no longer to the algorithm imposed by the second device to authenticate the first device, but to another decryption algorithm which is used by the first device to secure the authenticating process but which is not that used by the second device during the authenticating method. It is thus possible to adapt and secure the white-box implementation of this other decryption algorithm in the first device, without this having any impact for the second device, in particular without there being any need for in-depth modification of the configuration of the second device, and maintaining a good level of security all the while. Any adaptation of the white-box implementation on the side of the first device is then without consequence for the second device, which offers more flexibility to better secure the authenticating method against attacks.

Particular embodiments are now described with reference to FIGS. 2-8. Unless otherwise specified, elements which are shared or similar across several figures bear the same reference signs and have identical or similar features, such that these shared elements are not generally described again for the sake of simplicity.

FIG. 2 shows an environment E wherein a first device DV1 cooperates with a second device DV2. The first device DV1 and the second device DV2 together form a system SY1.

In this example, the first device DV1 is a terminal, such as a mobile phone (smartphone) or a tablet for example. The second device DV2 is an appliance included in, or coupled with, a vehicle 8. In a variant, the device DV2 can be the vehicle 8 itself.

In this example, a user UR uses the terminal DV1 to authenticate himself to the vehicle 8, and more particularly to the second device DV2 which controls access to the vehicle 8.

The environment E may optionally include a remote server SV1 capable of communicating with at least the first device DV1 and the second device DV2 (or at least one out of these). The server SV1 can for example transmit data in the form of tokens TN (also called data groups) to the first device DV1, or else transmit challenge data CH2 to the second device DV2. Implementations of the disclosure are however possible without such a server SV1.

FIG. 3 shows the structure of the first device DV1 illustrated in FIG. 2, according to a particular embodiment. The first device DV1 in this example includes a processor 10, a volatile memory 12, a non-volatile memory 14, a non-volatile memory 16 and a communication interface INT1.

The memory 14 is a rewritable non-volatile memory or a read-only memory (ROM), this memory constituting a recording medium (or information medium) in accordance with a particular embodiment, readable by the first device DV1, and on which is registered a computer program PG1 in accordance with a particular embodiment. This computer program PG1 includes instructions for executing the steps of a processing method according to a particular embodiment, as described further on.

The memory 16 a rewritable non-volatile memory able to store tokens TN, a white-box implementation—denoted wb[pdec]—of a decryption algorithm pdec, along with a predetermined cryptographic algorithm ALp. The contents of the memory 16 may however vary according to the implementation of the disclosure under consideration. In this example, the memory 16 stores a set of tokens TN denoted TN1 to TN20, each of them including: key data $C_{EC}$, a challenge datum CH2, and data EXP and ID. As described further on, the content of the tokens TN and the number of tokens TN may vary according to the case. By way of example, implementations are possible without such tokens TN, or else without the data EXP and ID in these tokens TN.

As described further on, the key data $C_{EC}$ include an encrypted cryptographic key $D_{EC}$ which results from an encryption by execution of an encryption algorithm penc. As will become more apparent further on, this encryption algorithm penc is the counterpart of the decryption algorithm pdec, and conversely (in other words, these two algorithms are in concordance with one another), such that the decryption algorithm pdec makes it possible to cancel, or decrypt, an encryption performed by the encryption algorithm penc.

The encrypted cryptographic key $D_{EC}$ is therefore equivalent to the cryptographic key $K_{EC}$ in encrypted form ($D_{EC}=enc(K_{EC})$) The decryption algorithm pdec with white-box implementation can be any decryption algorithm (a proprietary algorithm, or all or part of the AES algorithm etc.) As described further on, an aspect of the disclosure is based on the fact that the white-box implementation technique is applied to this decryption algorithm pdec in this example.

The key data $C_{EC}$ (and therefore the encrypted cryptographic key $D_{EC}$ contained in $C_{EC}$) are further masked by execution of a cryptographic masking function F1 on the basis of the encrypted cryptographic key $D_{EC}$ and a masking key K1. In other word, the key data $C_{EC}$ result from the execution of the cryptographic masking function F1 taking as input the encrypted cryptographic key $D_{EC}$ and the masking key K1. Thus, the encrypted cryptographic key $D_{EC}$, contained in the key data $C_{EC}$, is therefore masked by execution of the masking function F1. The key data $C_{EC}$ is therefore equivalent to the cryptographic key $K_{EC}$ in encrypted form (by pdec) then masked (by F1).

As indicated further on, it is not the first device DV1 which performs the masking by means of the function F1 to generate the key data $C_{EC}$. The first device DV1 is however able to obtain or receive the key data $C_{EC}$ and store them in the memory 16.

The nature and use of the different elements contained in the memory 16 will be described in more detail further on.

The communication interface INT1 allows the first device DV1 to communicate with the second device DV2, via an appropriate communication link, of wired or wireless type (for example via a Bluetooth, Wi-Fi, NFC or radiocommunication type for example such as GSM or LTE).

The processor 10 also uses the volatile memory 12 to perform the different operations or functions necessary for the operation of the first device DV1, including to execute the computer program PG1 during the implementation of the processing method of the disclosure.

FIG. 4 shows the structure of the second device DV2 illustrated in FIG. 2, according to a particular embodiment. The second device DV2 in this example includes a processor 20, a volatile memory 22, a non-volatile memory 24, a non-volatile memory 26 and a communication interface INT2.

The memory 24 is a rewritable non-volatile memory or a read-only memory (ROM), this memory constituting a recording medium (or information medium) in accordance with a particular embodiment, readable by the second device DV2, and on which is recorded a computer program PG2 in accordance with a particular embodiment. This computer program PG2 includes instructions for executing the steps of a processing method according to a particular embodiment, as further on described.

The memory 26 is a rewritable non-volatile memory able to store the predetermined cryptographic algorithm ALp mentioned above, an encryption algorithm AL1, a master key MK from which one or more keys $K_{EC}$ can be derived, a key TK and data EPX and ID. The contents of the memory 26 can however vary according to the implementation of the disclosure under consideration. By way of example, implementations are possible without at least one (or none) from among EXP, ID, TK and MK.

As shown in FIG. 4, the memory 26 can also be able to store a time datum EXPmin (hereinafter referred to as second time datum), although implementations of the disclosure are possible in this time datum.

The nature and use of the different elements contained in the memory 26 will be described in more detail further on in particular examples.

In the example under consideration here, the predetermined cryptographic algorithm ALp is therefore used by the first and second devices DV1, DV2 during an authenticating method to authenticate the first device DV1 to the second device DV2. This cryptographic algorithm ALp can be any algorithm used to perform an encryption (or more generally a cryptographic operation), as long as the first and second devices DV1, DV2 use the same cryptographic algorithm ALp, of course. This cryptographic algorithm ALp can for example be an AES encryption algorithm, or a signature-computing algorithm, or else a MAC (Message Authentication Code) identifier-computing algorithm, for example based on AES. Insofar as in-depth modification of the configuration of the second device DV2 is undesirable, the nature of the cryptographic algorithm ALp implemented in the first device DV1 is therefore imposed by the configuration of the second device DV2.

Moreover, the communication interface INT2 is configured to cooperate with the communication interface INT1 of the first device DV1 (and conversely) in order to establish a communication link between DV1 and DV2. As already indicated, this link can be of various kinds (wired or wireless).

The processor 20 further uses the volatile memory 22 to perform the different operations or functions necessary for the operation of the second device DV2, including to execute the computer program PG2 during the implementation of the processing method of the disclosure.

Note that the first and second devices DV1, DV2 shown in FIGS. 2-4 only constitute exemplary embodiments, other implementations being possible within the scope of the disclosure. As will be understood by those skilled in the art, certain elements of the first and second devices DV1, DV2 are only described here to simplify the understanding of the disclosure, these elements not being necessary to implement the disclosure.

As shown in FIG. 5 according to a particular embodiment, the processor 10 of the first device DV1, driven by the computer program PG1, here implements a certain number of modules, namely: a first receiving module MD2, an obtaining module MD4, a second receiving module MD6, a first determining module MD8, a second determining module MD10, a third determining module MD12 and a sending module MD14, and also where applicable a second obtaining module MD16 and/or a second sending module MD18. Implementations of the disclosure are however possible, in particular without these modules MD16 and MD18.

More precisely, the first receiving module MD2 is configured to receive, from the second device DV2, first data DT1 including a first challenge datum CH1.

The obtaining module MD4 is configured to obtain key data $C_{EC}$ as already described above with reference in particular to FIG. 3. Thus, the key data $C_{EC}$ include an encrypted cryptographic key denoted $D_{EC}$ (which has been encrypted beforehand by a cryptographic algorithm penc), the key data $C_{EC}$ being themselves masked by the prior execution of a cryptographic masking function F1 on the basis of the encrypted cryptographic key $D_{EC}$ and a masking key K1.

Thus, as already indicated, the encrypted cryptographic key $D_{EC}$ is an encrypted version of the cryptographic key $K_{EC}$, this version being obtained by the encryption of the cryptographic key $K_{EC}$ by means of a cryptographic algorithm penc. Furthermore, the encrypted cryptographic key $D_{EC}$, contained in the key data $C_{EC}$, is itself masked by the execution of the masking function F1.

The way in which the obtaining module MD4 retrieves the key data $C_{EC}$ can vary according to the case, as will be described further on. The key data $C_{EC}$ may for example be received beforehand from the outside, for example from the server SV1 (FIG. 2). The server SV1 can for example be configured to generate these key data $C_{EC}$.

The second receiving module MD6 is configured to receive, from the second device DV2, an unmasking key K2. This unmasking key K2 is configured to be able to be used as input of a cryptographic unmasking function F2 as indicated below.

The first determining module MD8 is configured to determine the encrypted cryptographic key $D_{EC}$ (i.e. the encrypted, but not masked, version of the key $K_{EC}$) by executing a cryptographic unmasking function F2 on the basis of the key data $C_{EC}$ obtained by the obtaining module MD4 and on the basis of the unmasking key K2 received by the second receiving module MD6. The unmasking function F2 is configured such as to cancel the masking previously performed by the function F1 to generate the key data $C_{EC}$. In other words, the first determining module MD8 performs an unmasking of the key data $C_{EC}$ using the unmasking function F2 which is an inverse cryptographic function of the masking function F1 used to generate the key data $C_{EC}$. As mentioned further on, various cryptographic functions F1 and F2 may be envisioned as long as they are the inverse of one another.

The second determining module MD10 is configured to determine the decrypted cryptographic key $K_{EC}$ by a decryption by executing the decryption algorithm pdec with white-box implementation (i.e. the white-box implementation wb[pdec]) on the basis of the encrypted cryptographic key $D_{EC}$ determined by the first determining module MD8.

The third determining module MD12 is configured to determine an answer datum ANS1 by a cryptographic operation by executing a predetermined cryptographic algorithm ALp as mentioned above on the basis of the decrypted cryptographic key $K_{EC}$ determined by the second determining module MD10 and of the first challenge datum CH1 received by the first receiving module MD2. As described hereinafter in particular examples, this cryptographic operation can be an encryption or other types of cryptographic operation (signature computation, MAC computation etc.).

The sending module MD14 is configured to send to the second device DV2, in answer to the first data DT1 received by the first receiving module MD2, the answer datum ANS1 determined by the third determining module MD12, such as to authenticate the first device DV1 to the second device DV2.

As already indicated, the first device DV1 can where applicable also include a second obtaining module MD16 configured to obtain at least one token TN including the key data $C_{EC}$. The obtaining module MD4 is then configured to extract the key data $C_{EC}$ from the token TN. According to particular embodiments, the token TN may include various other data, such as a challenge datum CH2 or else data EXP and ID, the nature and use of which will be described further on.

As already indicated, the first device DV1 can where applicable also include a second sending module MD18 configured to send to the second device DV2 second data DT2 including a second challenge datum CH2 (the latter being for example extracted from a token TN obtained where applicable by the second obtaining module MD16).

The configuration and operation of the modules MD2-MD18 of the first device DV1 will appear in more detail in the exemplary embodiments described hereinafter with reference to FIGS. 6-8. Note that the modules MD2-MD18 as shown in FIG. 5 show only an exemplary embodiment of the disclosure, without limitation.

In general, for each step of the processing method of the disclosure, the first device of the disclosure may include a corresponding module configured to perform said step.

A particular embodiment will now be described with reference to FIG. 6. More precisely, the first device DV1 (hereinafter referred to as the "terminal") and the second device DV2 previously described with reference to FIGS. 2-5 cooperate together, particularly to allow the first device DV1 to authenticate itself to the second device DV2. To do this, the terminal DV1 implements a processing method (or authenticating method), in cooperation with the second device DV2, by executing the computer program PG1. In the same way, the second device DV2 executes the computer program PG2 to authenticate the terminal DV1.

During a receiving step S2, the terminal DV1 receives from the second device DV2 first data DT1 including a first challenge datum denoted CH1. The second device DV2 for example chooses the challenge datum CH1 sent in S2 to the terminal DV1 at random in order to make the method more secure.

Moreover, the terminal DV1 obtains (S4) key data $C_{EC}$ including an encrypted cryptographic key $D_{EC}$, said key data $C_{EC}$ (and therefore the encrypted key $D_{EC}$ contained in the key data $C_{EC}$) being masked by execution of a cryptographic masking function F1 on the basis of the encrypted cryptographic key $D_{EC}$ and a masking key K1.

More particularly, the encrypted cryptographic key $D_{EC}$ results from an encryption by a cryptographic algorithm penc. In other words, the encrypted cryptographic key $D_{EC}$ is an encrypted version of the cryptographic key $K_{EC}$, this version being obtained by the encryption of the cryptographic key $K_{EC}$ by means of the cryptographic algorithm penc.

Furthermore, the encrypted cryptographic key $D_{EC}$, contained in the key data $C_{EC}$, is itself masked by the execution of the cryptographic masking function F1. The key data $C_{EC}$ are therefore equivalent to the cryptographic key $K_{EC}$ in encrypted form (by pdec) then masked (by F1).

The way in which the terminal DV1 retrieves the key data $C_{EC}$ can vary according to the case, as described further on. The key data $C_{EC}$ can for example be received beforehand from the outside, for example from the server SV1 (FIG. 2). According to a particular example, it is the server SV1 which generates the key data $C_{EC}$, by encrypting the cryptographic key $K_{EC}$ to obtain the encrypted cryptographic key $D_{EC}$ by executing the encryption algorithm penc, then by masking the decrypted cryptographic key $D_{EC}$ thus obtained by executing the cryptographic masking function F1 on the basis of a masking key K1.

Beforehand the terminal DV1 can record in its memory 16 (FIG. 3) the key data $C_{EC}$ received and consult its memory 16 to retrieve these data in the obtaining step S4.

During a sending step S6, the terminal DV1 then sends to the second device DV2 second data DT2 including a second challenge datum denoted CH2. The way in which the terminal DV1 determines beforehand the second challenge datum CH2 to send to the second device DV2 may vary according to the case. The terminal DV1 can for example receive and record beforehand, in its memory 16, the second challenge datum CH2 in association with the key data $C_{EC}$. As indicated hereinafter, implementations are possible wherein the terminal DV1 does not send any second data DT2 to the second device DV2.

In this example, the second device DV2 then determines (S8), on the basis of the second challenge datum CH2 received in S6, an unmasking key K2. More precisely, the second device DV2 computes this unmasking key K2 by executing an encryption algorithm AL1 on the basis of the second challenge datum CH2 and where applicable also on the basis of a key TK stored in the memory 26 of the second device DV2 (although use of this key TK is not obligatory). In other words, the encryption algorithm AL1 takes as input the second challenge datum CH2, and where applicable also the key TK, to produce the unmasking key K2 as output. This unmasking key K2 constitutes an answer with the aim of allowing the terminal DV1 to unmask the encrypted cryptographic key $D_{EC}$ contained in this masked form in the key data $C_{EC}$.

Note that any encryption algorithm AL1 may be used in S8 by the second device DV2 to generate the required unmasking key K2 as long as it can produce the required unmasking key K2 for the terminal DV1 to then be able to perform the unmasking S12 as described hereinafter. In particular, the encryption algorithm AL1 may be different from the predetermined cryptographic algorithm ALp used by the terminal DV1 and the second device DV2 to authenticate the terminal DV1. The encryption algorithm AL1 may be the AES algorithm or any other appropriate encryption algorithm.

During a sending step S10, the second device DV2 thus sends to the terminal DV1, in response to the second data DT2 received in S6, the unmasking key K2. The sending in S6 of the second challenge datum CH2 from the terminal DV1 to the second device DV2 makes it possible to further secure the processing method insofar as the unmasking key K2 can only be generated by the second device DV2 on the basis of the challenge datum CH2 supplied beforehand by the terminal DV1 during an interaction. However, other implementations are possible wherein the second device DV2 does not need any second challenge datum CH2 of the terminal DV1 to generate or obtain the unmasking key K2.

As a variant, the terminal DV1 does not send the second data DT2 during the sending step S6, and the second device DV2 determines, in S8, the unmasking key K2 in any appropriate way (this key K2 can in particular be received from the outside). The second device DV2 then sends, in S10, the unmasking key K2 to the terminal DV1 without answering any challenge datum CH2 from the terminal DV1.

According to a particular example, the second device DV2 receives the unmasking key K2 from the server SV1. To do this, the second device DV2 for example receives, from the server SV1, a list of one or more unmasking keys K2. The second device DV2 then extracts the unmasking key K2 from this list, for example following a predetermined order, and sends it in S10 to the terminal DV1.

According to another example, DV2 can receive the challenge data CH2 or the unmasking keys K2, from a server SV1, in association with the keys KEG.

The terminal DV1 thus receives (S10), in answer to the second data DT2, the unmasking key K2 supplied by the second device DV2. During a determining step S12, the terminal DV1 then determines the encrypted cryptographic key $D_{EC}$ by executing a cryptographic unmasking function F2 (as mentioned above) on the basis of the key data $C_{EC}$ obtained in S4 and of the unmasking key K2 received in S10. In other words, the unmasking function F2 is executed taking as input the key data $C_{EC}$ and the unmasking key K2 to unmask the key data $C_{EC}$ and thus obtain as output the encrypted cryptographic key $D_{EC}$.

The unmasking function F2 may be adapted according to the case and is chosen such as to cancel the masking effect produced by the cryptographic masking function F1 to produce the key data $C_{EC}$. In other words, the unmasking function F2 is chosen as a function of the masking function F1 such as to produce the inverse cryptographic effect of the masking function F1 (i.e. an unmasking effect).

According to a particular example, the cryptographic masking F1 and unmasking F2 functions are associated encryption and decryption functions respectively. Various encryption and decryption functions may be envisioned. According to a particular example, the cryptographic masking F1 and unmasking F2 functions are symmetrical encryption functions, the masking key K1 (on the basis of which the key data $C_{EC}$ are generated) and the unmasking key K2 being identical. In a variant, the cryptographic masking F1 and unmasking F2 functions are asymmetrical encryption and decryption functions, where the keys K1 and K2 are different public and private keys respectively.

According to a particular example, the cryptographic masking F1 and unmasking F2 functions are "exclusive OR" functions, so-called XOR (or exclusive disjunction) functions. The XOR function, well-known to those skilled in the art, is conventionally represented by the symbol "⊕". In this special case, the functions F1 and F2 are therefore identical and cancel out insofar as the masking effect produced by the application of F1 is cancelled out by the application of F2 in S12.

The initial masking of the key data $C_{EC}$ offers an advantageous protection of the cryptographic key $K_{EC}$ insofar as, to be able to extract the encrypted cryptographic key $D_{EC}$ (and thus deduce from it the cryptographic key $K_{EC}$), the terminal DV1 must beforehand be able to interact with the second device DV2 such as to retrieve the unmasking key K2. It is only by using this unmasking key K2 that the terminal DV1 can, by execution of the cryptographic unmasking function F2, determine the encrypted cryptographic key $D_{EC}$, i.e. the cryptographic key $K_{EC}$ in an encrypted form. Without the unmasking key supplied by the second device DV2, it is not possible for an attacker to unmask the encrypted cryptographic key $D_{EC}$.

During a determining step S14, the terminal DV1 then determines the cryptographic key $K_{EC}$ in its decrypted form (in plaintext). To do this, the terminal DV1 performs a decryption by executing a cryptographic decryption algorithm pdec with white-box implementation on the basis of the encrypted cryptographic key $D_{EC}$. In other words, the terminal DV1 executes the white-box implementation wb[pdec] of the decryption algorithm pdec by taking as input the encrypted cryptographic key $D_{EC}$ such as to produce as output the cryptographic key $K_{EC}$ in plaintext.

Thus, according to the principle of the disclosure, the white-box implementation technique is applied, not to the predetermined encryption algorithm ALp imposed by the second device DV2 to authenticate the terminal DV1, but to the decryption algorithm pdec which is specific to the terminal DV1 and which can therefore be adapted by those skilled in the art with more freedom than the algorithm ALp to secure the method as well as possible.

The decryption algorithm pdec can be any decryption algorithm as long as it can invert (or cancel out) the encryption previously performed by the encryption algorithm penc to generate the encrypted cryptographic key $D_{EC}$, such as to obtain the cryptographic key KEG. In other words, the encryption algorithm penc and the decryption algorithm pdec are associated cryptographic algorithms configured to perform inverse cryptographic functions.

The decryption algorithm pdec can for example be a proprietary algorithm, or else all or part of the AES algorithm, etc. According to a particular example, the encryption algorithm penc and the decryption algorithm pdec are different from the predetermined cryptographic algorithm ALp used by the second device DV2 to authenticate the terminal DV1. Note that the difference may pertain to the implementation of one and the same type of algorithm (for one and the same mathematical principle). By way of example, the algorithms ALp and pdec (as well as penc) can be different algorithms in the sense that their respective software implementations are different, for example in the case where the algorithm pdec is an AES algorithm with white-box implementation while the algorithm ALp is an AES algorithm with non-white-box implementation.

According to a particular example, the decryption algorithm pdec is an algorithm other than the AES algorithm.

Note that, during the step S14, the white-box implementation wb[pdec] of the decryption algorithm pdec may where applicable take as input, besides the encrypted cryptographic key $D_{EC}$, data specific to the terminal DV1 and/or from the user UR of the terminal DV1 (for example a secret PIN code entered by the user UR).

The white-box implementation wb[pdec] of the decryption algorithm pdec can also take into account a key, which can be buried in the white-box implementation or "tokenized" (i.e. in the form of a token), and passed as a parameter of the white box. This tokenized key can for example be obtained by the terminal DV1 from the key data $C_{EC}$ obtained in S4.

During a determining step S16, the terminal DV1 then determines an answer datum ANS1 by an encryption (or more generally by a cryptographic operation) by executing a predetermined cryptographic algorithm ALp (as mentioned above) on the basis of the decrypted cryptographic key $K_{EC}$ determined in S14 and of the first challenge datum CH1 previously received in S2. In other words, the terminal DV1 executes the predetermined cryptographic algorithm ALp taking as input the cryptographic key $K_{EC}$ and the challenge datum CH1 such as to produce as output the answer datum ANS1, which constitutes an answer to the challenge datum CH1 received in S2.

In the example under consideration here, the cryptographic algorithm ALp does not have white-box implementation (although this is possible). As described above, the white-box implementation technique is applied to the decryption algorithm pdec in S14, which makes it possible to improve the flexibility and security of the processing method.

During a sending step S18, the terminal DV1 then sends to the second device DV2, in response to the first data DT1 received in S2 (and in particular in response to the challenge datum CH1), the answer datum ANS1 to authenticate the terminal DV1 (and therefore the user UR) to the second device DV2.

Once the answer datum ANS1 has been received (S18), the second device DV2 authenticates (S20) the terminal DV1 on the basis of the answer datum ANS1 and of the challenge datum CH1. More precisely, the second device DV2 computes (S22) a theoretical answer datum ANS1a by an encryption (or more generally by a cryptographic operation) by executing the predetermined cryptographic algorithm ALp on the basis of the cryptographic key $K_{EC}$ and of the challenge datum CH1 previously sent in S2. In other words, the second device DV2 executes the predetermined cryptographic algorithm ALp taking as input the cryptographic key $K_{EC}$ and the challenge datum CH1 such as to produce as output the theoretical answer datum ANS1a. The second device DV2 may retrieve the cryptographic key $K_{EC}$ in any appropriate way.

The second device DV2 then compares (S24) the answer datum ANS1 supplied by the terminal DV1 in S18 with the theoretical answer datum ANS1a determined in S22. If the answer datum ANS1 received coincides with the theoretical answer datum ANS1a, the terminal DV1 is successfully authenticated, otherwise the authentication fails. In other words, the terminal DV1 is successfully authenticated only if there is a match between ANS1 and ANS1a.

As already stated, the predetermined cryptographic algorithm ALp used by the first and second devices DV1, DV2 during an authentication method for authenticating the first device DV1 may vary according to the case, as long as this same cryptographic algorithm ALp is used by both the terminal DV1 and the second device DV2 (so that the answer datum ANS1 can be verified by the second device DV2 in S20). This cryptographic algorithm ALp can for example be an AES encryption algorithm, or a signature-computing algorithm, or else a MAC (Message Authentication Code) identifier-computing algorithm, for example based on AES. The principle of computing of a signature or else a MAC is well-known to those skilled in the art and is therefore not described in detail here for the sake of simplicity.

The second device DV2 can furthermore control access to a function F3 (here any function of the vehicle 8) as a function of the result of the authenticating step S20. In particular, if the terminal DV1 is successfully authenticated, the second device DV2 may trigger the implementation of the function F3, while the function F3 is blocked if the authentication fails. As already mentioned, this function F3 can for example include controlling the access to the vehicle 8 or control its starting.

According to a particular example, following the sending step S18 (FIG. 6), the terminal DV1 is reconfigured such as to modify the decryption algorithm pdec by replacing it with a new decryption algorithm pdec different from the old one. The authenticating method as described above in the steps S2-26 can then be done again using, in S14, the new decryption algorithm pdec implemented with white-box implementation in the terminal DV1.

This disclosure advantageously makes it possible to authenticate the first device DV1 to the second device securely and flexibly. In the example described above, the second device DV2 executes the predetermined cryptographic algorithm ALp to authenticate the first device DV1. Since one wishes to modify the configuration (the application, the protocol, etc.) of the second device DV2 as little as possible, it is the configuration of the second device DV2 that obliges the first device DV1 to use this same cryptographic algorithm ALp during the authenticating method to generate the answer datum ANS1. This is because the use of the same algorithm ALp is required for the second device DV2 to be able to verify, in S20 (FIG. 6), the validity of the answer datum ANS1 supplied by the first device DV1 by computing a theoretical answer datum ANS1$a$ as described above.

However, a principle of the disclosure is based on the fact that the white-box implementation technique is applied during the execution (S14, FIG. 6) by the first device DV1 of the decryption algorithm pdec. Thus, it is the cryptographic algorithm pdec which has white-box implementation in the first DV1 and not the cryptographic algorithm ALp (although this is possible). As long as the choice of the algorithms ALp and pdec is decorrelated, it is possible to carefully choose, and adapt as needed, the decryption algorithm pdec with white-box implementation (S14) in the first device DV1, without modifying the cryptographic algorithm ALp executed (S16, S22) in the first and second devices DV1, DV2. In other words, any cryptographic algorithm ALp can be used by the second device DV2 as long as the same cryptographic algorithm ALp is also used by the first device DV1 to generate the answer datum ANS1 (S16, FIG. 6). In particular, the cryptographic algorithm ALp does not need to be secured by white-box implementation in the first device DV1. The disclosure thus makes it possible to gain configuration flexibility, particularly when an attack has compromised the security of the first device DV1 and it is necessary to modify the white-box implementation of the decryption algorithm pdec in the first device DV1.

As already mentioned, the number of possible white-box implementations is limited for one and the same algorithm. Thus, in the event of a security problem, it is possible in the disclosure to modify the decryption algorithm pdec such that a new pdec algorithm is implemented with white-box implementation by the first device DV1 during the step S14 (FIG. 6) of determining the cryptographic key $K_{EC}$, which makes it possible to reinforce the security of the authenticating method without this having any impact on the configuration of the second device DV2. In other words, the disclosure thus makes it possible to more easily renew the white-box implementation of the decryption algorithm pdec without any effect on the second device DV2 which does not execute the decryption algorithm pdec.

An attacker may however attempt to analyze the decryption algorithm pdec implemented with white-box implementation to extract the cryptographic key $K_{EC}$, but the algorithm pdec can be a proprietary algorithm (or where applicable all or part of the AES algorithm) and can be regularly modified, which makes all attacks difficult. According to a particular example, the decryption algorithm pdec is an algorithm other than the AES algorithm.

Another advantage of the disclosure lies in the fact that it requires the first device DV1 to interact with the second device DV2 to retrieve the unmasking key K2 allowing it to then unmask the encrypted key $D_{EC}$, which leaves an attacker a limited time in which to discover the decrypted key $K_{EC}$ and use it. This prior interaction of the first device DV1 with the second device DV2 makes attacks more complicated as it obliges the attacker to interact beforehand with the second device DV2 to determine the cryptographic key $K_{EC}$. If the transaction does not take place correctly (for example it does not finish correctly or takes too much time), the second device DV2 can in particular block the cryptographic key $K_{EC}$ such that it is considered invalid, thus preventing any subsequent authentication on the basis of this key.

Variant implementations of the embodiment of FIG. 6 will be described hereinafter with reference to FIGS. 7 and 8. Unless otherwise specified, the description given above of the different features and steps of the disclosure according to the embodiments described above are applicable in the same way to the equivalent features with the same reference sign in the variants of FIGS. 7 and 8.

According to the embodiment shown in FIG. 7, it is again supposed that the first device DV1 (hereinafter referred to as the "terminal") and the second device DV2 previously described with reference to FIGS. 2-5 cooperate together, particularly to allow the first device DV1 to authenticate itself to the second device DV2. To do this, the terminal DV1 implements a processing method (or authenticating method), in cooperation with the second device DV2, by executing the computer program PG1. Similarly, the second device DV2 executes the computer program PG2 to authenticate the terminal DV1.

It is supposed in this example that the terminal DV1 receives (or obtains), during a step S40 of receiving (or obtaining) a plurality of tokens TN, each of them including key data $C_{EC}$ in association with a challenge datum CH2, a first time datum EXP and a key identifier ID. For each token TN, the first time datum EXP indicates a period of validity time during which the associated cryptographic key is valid. In addition, the identifier ID identifies the cryptographic key $K_{EC}$ associated with the token TN under consideration, this key $K_{EC}$ being usable during the validity period specified by the first time datum EXP.

The first time datum EXP can for example indicate an expiry time or an end of validity time (for example an expiry date and/or an expiry clock time), beyond which the associated cryptographic key $K_{EC}$ is no longer valid.

The identifier ID can be an index or take any other appropriate form. This identifier ID makes it possible to differentiate several cryptographic keys $K_{EC}$ (and more generally several tokens TN), including when the same validity period (and therefore the same value of the datum EXP) is assigned to several cryptographic keys $K_{EC}$. The values of the data EXP and ID may be chosen such that each token TN (and therefore each cryptographic key $K_{EC}$) is associated with a single pair (EXP, ID).

As already indicated, other implementations are also possible without recourse to the data EXP and ID. However, the use of the data EXP and ID is advantageous in that it makes it possible to limit the validity time of the cryptographic keys $K_{EC}$ and therefore limit the time during which an attacker can compromise the security of the system and use illicitly acquired keys.

In the example under consideration here, the terminal DV1 contains tokens TN, denoted TN1 to TN20, in its memory 16 (FIG. 3). It should however be noted that the number of tokens obtained by the terminal DV1 can vary according to the case. The terminal DV1 can be able to obtain one or a plurality of tokens TN as described above.

During a receiving step S42, the terminal DV1 receives from the second device DV2 first data DT1 including a first challenge datum CH1 (as already described above) and a second time datum EXPmin. In other words, the receiving step S42 differs from the step S2 (FIG. 6) previously described in that the first data DT1 received include, in addition to the first challenge datum CH1, a second time datum EXPmin. The second time datum EXPmin allows the terminal DV1 to make a selection of a token TN as described hereinafter in the step S44.

During a selecting step S44, the terminal DV1 selects, on the basis of the second time datum EXPmin received in S42 in the first data DT1, a token TN from among one or more tokens TN accessible by the terminal DV1, i.e. from among the tokens TN1-TN20 recorded in its memory 16 in the example under consideration here.

The second time datum EXPmin is indicative of a validity period in which the cryptographic key $K_{EC}$, of the token TN selected in S44, must be valid. In other words, the terminal DV1 selects a token TN (and therefore a corresponding cryptographic key $K_{EC}$), from among the available tokens TN1-TN20, which includes key data $C_{EC}$ satisfying the validity time condition imposed by EXPmin. The terminal DV1 determines whether or not key data $C_{EC}$ contained in a token TN respect this second time condition EXPmin on the basis of the first time datum EXP associated with the key data $C_{EC}$ in the token TN in question.

By way of example, the second time datum EXPmin indicates a remaining minimum time (for example a minimum expiry date) during which selected key data $C_{EC}$ (and therefore the corresponding cryptographic key $K_{EC}$) must be valid. The second device DV2 can thus request, via the second time datum EXPmin, that the terminal DV1 selects in S44 a token TN of which the cryptographic key $K_{EC}$ for example expires in at least 2 hours. On the basis of the value of the time datum EXPmin, the terminal DV1 can thus select an appropriate token TN in S44.

According to a particular example, the terminal DV1 selects in S44 a new token TN at each iteration of the authenticating method, i.e. with each new receiving (S42) of first data DT1.

Once the selection S44 has been made, the terminal DV1 sends (S46) to the second device DV2 second data DT2 including the second challenge datum CH2, the first time datum EXP and the identifier ID extracted from the token TN selected in S44. In other words, the sending step S46 differs from the step S6 (FIG. 6) previously described in that the second data DT2 include, in addition to the second challenge datum CH2, the data EXP and ID specified in the token TN selected in S44. In this case, the second challenge datum CH2 transmitted is therefore separate from the data EXP and ID contained in the second data DT2.

According to a particular example, the terminal DV1 signs the second data DT2 with a private key SKm before sending them to the second device DV2. According to another example, the signing of the second data DT2 is performed by the server SV1 then received and stored with the associated token in the first device DV1. The second device DV2, which possesses a public key PKm associated with the private key SKm, can then verify the signature. The second device DV2 accepts to continue the authenticating method only if the signing is verified successfully. This variant in particular makes it possible to avoid any DoS (Denial of Service) attacks which aim to block the second device DV2 such that the legitimate user UR cannot authenticate himself and is therefore deprived of the service under consideration. Such an attack might be possible if an attacker passing itself off as the terminal DV1 were to send to the second device DV2, in the first time data DT1, an arbitrary or erroneous value of the first time datum EXP. In such a case, the second device DV2 could subsequently refuse tokens TN that do not have a validity ranging at least up to the end of the validity time indicated by the last EXP received.

Moreover, once the second data DT2 have been received, the second device DV2 verifies (S48), on the basis of these second data DT2, the validity of the token TN (and therefore of the cryptographic key $K_{EC}$) that the terminal DV1 selected in S44. More precisely, in the example under consideration here, the second device DV2 verifies in S48, on the basis of the first time datum EXP and the identifier ID which are contained in the second data DT2 received, the validity of the token TN selected by the terminal DV1. The second device DV2 verifies for example, on the basis of the data EXP and ID, that the token TN chosen in S44 by the terminal DV1 has not already been used by the terminal DV1 or by another terminal. During this verification, the second device DV2 can in particular compare the first time datum EXP received in S46 with the second time datum EXPmin contained in the data DT1 sent to the terminal DV1 in S42, to verify if the first time datum EXP satisfies the validity time condition imposed by EXPmin. As already stated, for the token TN to be valid, it is specifically necessary for the first time datum EXP associated with the key data $C_{EC}$ of the token TN to satisfy the time validity condition imposed by EXPmin.

If the second device DV2 determines in S48 that the token TN selected by the terminal DV1 is valid, the method then continues in the computing step S50. In the opposite case, the authentication of the terminal DV1 fails and the authenticating method comes to an end (where applicable the second device warns the terminal DV1 of the failure and asks it to select another token TN respecting the second time datum EXPmin).

During the computing step S50, the second device DV2 computes (or determines) an unmasking key K2 on the basis of the second challenge datum CH2 received in the second data DT2 received in S46. This computing step S50 can be done in the same way as the step S8 (FIG. 6) previously described, by executing an encryption algorithm AL1. As already stated, the second device DV2 can also take into account other inputs, such as a key TK, during the execution of the encryption algorithm AL1.

During the computing step S50, the unmasking key K2 can be determined by executing the encryption algorithm AL1 taking as input, in addition to the second challenge datum CH2 (and where applicable the key TK), the first time datum EXP and the identifier ID. This makes it possible to further reinforce the security of the computation of the unmasking key K2. This in particular makes it possible to avoid an attacker from re-using a token which has expired by modifying the time datum EXP (a date for example) or the identifier ID sent to the second device DV2. In such a case, the unmasking key K2 determined in S50 would then be different from that intended to function for the token TN in question.

The second device DV2 then sends (S10) the unmasking key K2 to the terminal DV1.

Note that in the example under consideration here, the terminal DV1 includes, in the second data DT2 sent in S46 to the second device DV2, a second challenge datum CH2 in addition to the first time datum EXP and the identifier ID (in other words, it is not the data EXP and ID that play the role of the second challenge datum). The data EXP and ID allow the second device DV2 to verify the validity of the token TN selected while the second challenge datum CH2 allows the second device DV2 to compute the unmasking key K2. Variants are however possible wherein the terminal DV1 does not include, in the second data DT2 transmitted (S46) to the second device DV2, a second challenge datum CH2 in addition to the data EXP and ID. In this case, it is the data EXP and ID (or at least one out of these two data) which serve as the second challenge datum and which are therefore used by the second device DV2 in S50 to determine the unmasking key K2. The inclusion in the second data DT2 of a second challenge datum CH2 in addition to the first time datum EXP and the identifier ID is however advantageous in that it makes it possible to avoid any problems of collision in the use of the different tokens TN. In general, such collision problems can be avoided by installing a mechanism making it possible to guarantee that each pair (EXP, ID) is unique in the tokens TN deployed. On the basis of the pair (EXP, ID) received in the second data DT2, the second device DV2 can then determine whether or not the corresponding token TN is still valid.

In a variant, the second data DT2 transmitted in S46 to the second device DV2 may include only the identifier ID then serving as second challenge datum (without including the first time datum EXP or the datum CH2 in the second data DT2 transmitted in S46). In this special case, the second device DV2 uses the identifier ID as the second challenge datum to determine, in S50, the unmasking key K2. Whatever the implementation envisioned, the second device DV2 must preferably be able to verify in S48 that one and the same token TN is not used twice.

According to a particular example, the terminal DV1 sends, in S46, for each new iteration of the method, a different second challenge datum CH2. In other word, the terminal DV1 sends in S46 a different second challenge datum CH2 for each token TN used to authenticate the terminal DV1 (to the second device DV2 or any other device).

Moreover, once the unmasking key K2 has been received in S10, the terminal DV1 performs the steps S12, S14, S16 and S18 as already described previously with reference to FIG. 6.

It is here supposed by way of example that the unmasking function F2 used is the XOR function as already mentioned above.

The second device DV2 thus receives the answer datum ANS1 in S18. In this example, the second device DV2 determines, during a determining step S60, the cryptographic key $K_{EC}$ which is used by the terminal DV1, i.e. that corresponding to the token TN selected by the terminal DV1 in S44. To do this, the second device DV2 derives (S60) the cryptographic key $K_{EC}$ on the basis of the master cryptographic key MK (stored in the memory 26 in this example), and where applicable also on the basis of the data EXP, ID and/or CH2 (i.e. at least one of them, for example EXP and ID, or EXP and CH2, or else ID and CH2 or EXP, ID and CH2) which were previously received in S46 in the two data DT2.

The second device DV2 then continues the method by performing the steps S20, S22, S24 and S26 as already previously described with reference to FIG. 6. In particular, the second device DV2 computes (S22) a theoretical answer datum ANS1a by an encryption (or more generally by a cryptographic operation) by executing the predetermined cryptographic algorithm ALp on the basis of the cryptographic key $K_{EC}$ computed in S60 and on the basis of the challenge datum CH1 previously sent in S42. The second device DV2 then compares (S24) the answer datum ANS1 received in S18 with the theoretical answer datum ANS1a and deduces therefrom that the authentication has been successful if there is a match between ANS1 and ANS1a.

According to the embodiment shown in FIG. 8, it is again supposed that the first device DV1 (hereinafter named "terminal") and the second device DV2 previously described with reference to FIGS. 2-5 then cooperate, particularly to allow the first device DV1 to authenticate itself to the second device DV2. To do this, the terminal DV1 implements a processing method (or authenticating method), in cooperation with the second device DV2, by executing the computer program PG1. In the same way, the second device DV2 executes the computer program PG2 to authenticate the terminal DV1.

The variant shown in FIG. 8 differs from the embodiment in FIG. 7 in that a key KRand encoded in a format suitable for white-box implementation is furthermore used by the terminal DV1, as input of the decryption algorithm pdec implemented with white-box implementation, to determine the cryptographic key $K_{EC}$ (in its decrypted form). This key KRand is thus only usable by the white-box implementation under consideration. To do this, the key KRand can have undergone any appropriate transformation (for example an encryption or a transformation in the form of a table performing an operation in which the key is hidden) such that said key KRand is only comprehensible or usable by the white-box implementation in question.

More precisely, as shown in FIG. 8, the terminal DV1 receives (or obtains), during a step S80 of receiving (or obtaining), a plurality of tokens TN, each of them including key data $C_{EC}$ in association with a challenge datum CH2, a first time datum EXP, a key identifier ID and a cryptographic key KRand encoded in a format suitable for white-box implementation, denoted wb[KRand]. In other words, the tokens TN differ from those described with reference to FIG. 7 in that they also include a key KRand encoded in a suitable format for white-box implementation, in association with the other elements already listed. This key KRand is therefore itself secured in order to protect it from any attacks.

The key KRand associated with each key datum $D_{EC}$ is for example a random key.

It is then supposed that the terminal DV1 and the second device DV2 together perform the steps S42 to S50 and the steps S10 and S12 as already described above with reference to FIG. 7.

During a determining step S86, the terminal DV1 then determines the cryptographic key $K_{EC}$ in its decrypted form (in plaintext). To do this, the terminal DV1 performs a decryption by executing a cryptographic decryption algorithm pdec with white-box implementation on the basis of the encrypted cryptographic algorithm $D_{EC}$ (obtained in S12) and on the basis of the key KRand with white-box implementation which was extracted from the token TN selected in S44. In other words, the terminal DV1 executes the white-box implementation wb[pdec] of the decryption algorithm pdec taking as input the encrypted cryptographic key $D_{EC}$ and the white-box implementation wb[KRand] of the key KRand such as to produce as output the cryptographic key $K_{EC}$ in plaintext.

Once the cryptographic key $K_{EC}$ has been determined (in its decrypted form), the terminal DV1 and the second device DV2 continue the processing method by executing the steps S16, S18, S60 and S20 to S26 as already described with reference FIG. 7.

This variant therefore makes provision for also supplying in the tokens TN a number of keys KRand with white-box implementation, which makes it possible to further secure the processing method of the disclosure.

Note moreover that the order in which the steps of the processing method as previously described with reference to FIGS. 6 to 8 follow one another constitutes only one exemplary embodiment, variants being possible.

Those skilled in the art will understand that the embodiments and variants described above constitute only non-limiting examples of implementation of the disclosure. In particular, those skilled in the art can envision any adaptation or combination of the embodiments and variants described above, in accordance with the claims presented hereinafter.

The invention claimed is:

1. A processing method implemented by a first device cooperating with a second device, said method comprising:
   a) receiving, from the second device, first data comprising a first challenge datum;
   b) obtaining key data comprising an encrypted cryptographic key resulting from an encryption by a first encryption algorithm, said key data being masked by executing a cryptographic masking function on the basis of the encrypted cryptographic key and a masking key;
   c) receiving, from the second device, an unmasking key;
   d) determining the encrypted cryptographic key by executing a cryptographic unmasking function on the basis of the key data obtained in b) and the unmasking key received in c);
   e) determining a decrypted cryptographic key by a decryption by executing a first decryption algorithm with white-box implementation on the basis of the encrypted cryptographic key, the first encryption algorithm and the first decryption algorithm being associated cryptographic algorithms configured to perform inverse cryptographic functions;
   f) determining an answer datum by a cryptographic operation by executing a predetermined cryptographic algorithm on the basis of the decrypted cryptographic key and the first challenge datum received; and
   g) sending to the second device, in response to the first data received in a), the answer datum to authenticate the first device to the second device.

2. The method of claim 1, wherein the first encryption algorithm and the first decryption algorithm are different from the predetermined cryptographic algorithm.

3. The method of claim 1, the method further comprising, before receiving in c) the unmasking key:
   h) sending, to the second device, second data comprising a second challenge datum; wherein the unmasking key received in c) from the second device is computed on the basis of the second challenge datum.

4. The method of claim 3, the method further comprising, before sending in h):
   i) obtaining a token, comprising:
      the key data;
      a first time datum indicating a validity period during which the cryptographic key is valid; and
      an identifier of said cryptographic key usable during said validity period;
   wherein the second data sent in h) comprises the first time datum and the identifier extracted from the token.

5. The method of claim 4, the method further comprising:
   j) selecting, on the basis of a second time datum contained in the first data received in a), the token obtained in i) from among one or more tokens accessible by the first device,
   said second time datum being indicative of a validity period in which the cryptographic key of the selected token must be valid.

6. The method of claim 4, wherein the token obtained in i) further comprises the second challenge datum which is separate from the first time datum and from the identifier;
   wherein the second data sent in h) comprises the second challenge datum extracted from the token.

7. The method of claim 4, wherein the first time datum and the identifier contained in the second data sent in h) constitute the second challenge datum.

8. The method of claim 4, wherein the token further comprises a key encoded in a format suitable for white-box implementation,
   wherein, in determining in e), the decrypted cryptographic key is determined by a decryption by executing the first decryption algorithm with white-box implementation on the basis of the encrypted cryptographic key and of the key encoded in a format suitable for white-box implementation extracted from the token.

9. The method of claim 1, wherein the cryptographic masking and unmasking functions are associated encryption and decryption functions, respectively.

10. The method of claim 9, wherein the cryptographic masking and unmasking functions are symmetrical encryption functions, the masking key and the unmasking key being identical.

11. The method of claim 9, wherein the cryptographic masking and unmasking functions are XOR functions.

12. The method of claim 1, the method further comprising, following sending in g):
   k) in response to a detection that the first device is authenticated successfully to the second device, triggering a predetermined function in cooperation with the second device.

13. The method according to claim 1, wherein the method is performed by a terminal computer.

14. A first device capable of cooperating with a second device, the first device comprising:
- a first receiving module configured to receive, from the second device, first data comprising a first challenge datum;
- an obtaining module configured to obtain key data comprising an encrypted cryptographic key resulting from an encryption by a first encryption algorithm, said key data being masked by execution of a cryptographic masking function on the basis of the encrypted cryptographic key and of a masking key;
- a second receiving module configured to receive, from the second device, an unmasking key;
- a first determining module configured to determine the encrypted cryptographic key by executing a cryptographic unmasking function on the basis of the key data obtained and the unmasking key received;
- a second determining module configured to determine a decrypted cryptographic key by a decryption by executing a first decryption algorithm with white-box implementation on the basis of the encrypted cryptographic key, the first encryption algorithm and the first decryption algorithm being associated cryptographic algorithms configured to perform inverse cryptographic functions;
- a third determining module configured to determine an answer datum by a cryptographic operation by executing a predetermined cryptographic algorithm on the basis of the decrypted cryptographic key and the first challenge datum received; and
- a sending module configured to send to the second device, in response to the first received data, the answer datum to authenticate the first device to the second device.

15. A system comprising: a first device; and
a second device;
wherein the first device is configured to:
- receive, from the second device, first data comprising a first challenge datum;
- obtain key data comprising an encrypted cryptographic key resulting from an encryption by a first encryption algorithm, said key data being masked by execution of a cryptographic masking function on the basis of the encrypted cryptographic key and of a masking key;
- receive, from the second device, an unmasking key;
- determine the encrypted cryptographic key via execution of a cryptographic unmasking function on the basis of the key data obtained and the unmasking key received;
- determine a decrypted cryptographic key by decryption via execution of a first decryption algorithm with white-box implementation on the basis of the encrypted cryptographic key, the first encryption algorithm and the first decryption algorithm being associated cryptographic algorithms configured to perform inverse cryptographic functions;
- determine an answer datum by a cryptographic operation by executing a predetermined cryptographic algorithm on the basis of the decrypted cryptographic key and the first challenge datum received; and
- send to the second device, in response to the first received data, the answer datum to authenticate the first device to the second device.

16. The system of claim 15, wherein the first device is a mobile phone or a tablet.

17. The system of claim 15, wherein the second device is a vehicle or an appliance located within a vehicle.

18. The system of claim 14, wherein the second device controls access to a vehicle.

19. The system of claim 15, further comprising:
a remote server configured to communicate with at least one of the first device and the second device.

20. The system of claim 19, wherein the remote server transmits data in the form of tokens to the first device or transmits challenge data to the second device.

* * * * *